T. B. DAVIS.

SCOOP.

No. 10,226. Reissued Oct. 31, 1882.

Witnesses:
Henry E. Parker,
James H. Hunter.

Inventor:
Thomas B. Davis

N. PETERS, Photo-Lithographer, Washington, D. C.

UNITED STATES PATENT OFFICE.

THOMAS B. DAVIS, OF NEW YORK, N. Y.

SCOOP.

SPECIFICATION forming part of Reissued Letters Patent No. 10,226, dated October 31, 1882.

Original No. 244,797, dated July 26, 1881. Application for reissue filed September 23, 1882.

*To all whom it may concern:*

Be it known that I, THOMAS B. DAVIS, of the city, county, and State of New York, have invented a new and Improved Scoop; and I do hereby declare that the following, taken in connection with the drawings which accompany and form part of this specification, is a description of my invention sufficient to enable those skilled in the art to practice it.

This invention relates to that class of scoops for which Letters Patent of the United States were granted to me December 8, 1868, No. 84,803; and it consists in the manner of uniting the edges of the blank composing the body without solder, and securing thereto the handle, as hereinafter fully described, whereby the cost of manufacture is reduced, and the whole acquires superior strength and durability.

Figure 1:
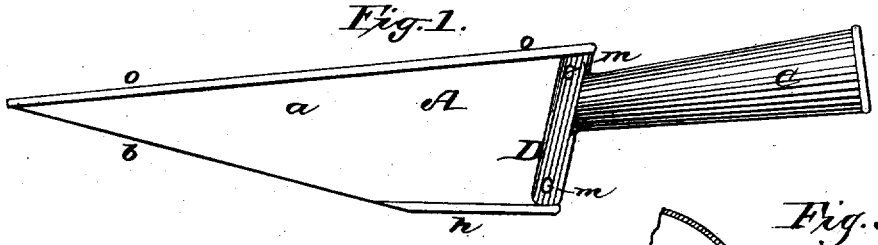
Figure 5:
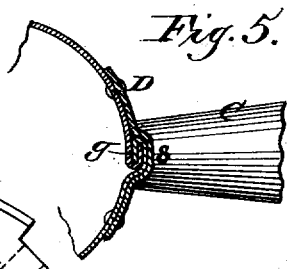
Figure 2:
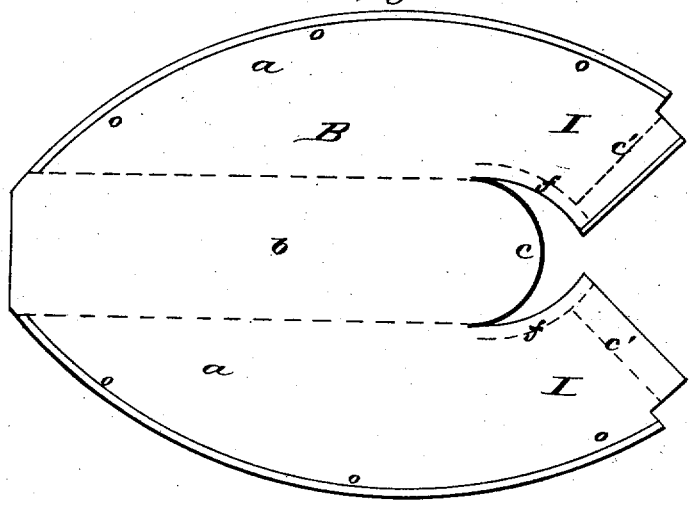
Figure 3:
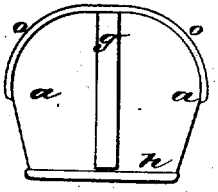
Figure 4:
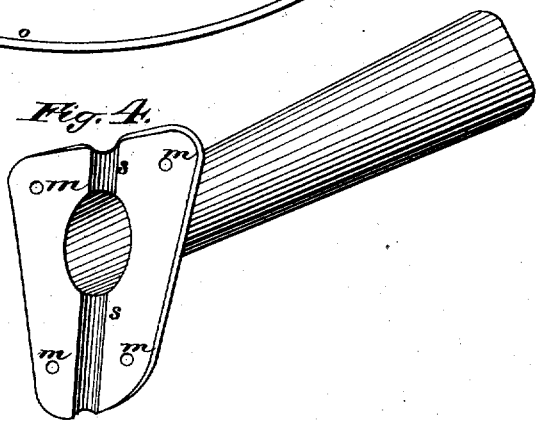

This invention is illustrated in the accompanying drawings, in which Figure 1 represents a side view. Fig. 2 is a plan or top view of the blank forming the body of the article. Fig. 3 is a rear end view of the body without the handle. Fig. 4 shows the handle in perspective view. Fig. 5 is a cross-section, showing the main joint of the body and the connection of the handle.

Similar letters of reference indicate corresponding parts.

The letter A designates the body of the scoop, constructed of a blank, B, Fig. 2, of sheet metal, in one piece, comprising the sides *a a* and the bottom *b*. The bottom part, *b*, of the blank is semicirular on its rear edge, as at *c*, while the side portions, *a a*, are straight on their rear edges, these side portions projecting beyond the rear edge of the bottom part in converging planes, forming wings I I, and the inner edges, *f f*, of these wings corresponding approximately to the outline of the rear edge of the bottom part. The converging wings I I of the side portions are longer aggregately than the semicircular ones at the rear edge, *c*, of the bottom part, the excess being equal to the area beyond the dotted lines *c′ c′*, Fig. 2, and they are bent or folded upon themselves on said dotted lines, one inwardly and the other outwardly, while they are drawn toward each other, meeting on the said dotted lines, and then folds are made to interlock with each other, thus forming a double lap seam or joint, *g*, which, when suitably compressed, serves to firmly unite the side portions, *a a*, and retain the body in the desired shape. The inner edges, *f f*, of the wings I I are united with the rear semicircular edge, *c*, of the bottom part, also by a lap-joint, *h*.

The general shape of the body A is similar to that shown and described in my Patent No. 84,803, before mentioned, and needs no description.

The letter C designates the handle of the scoop, constructed with a plate, D, at its inner end, whereby it is secured to the body A opposite to the lap-joint *g*, as by rivets *m*.

In the end plate, D, of the handle is formed a groove, *s*, adapted to receive the lap-joint *g* of the body, and when the plate is secured to the body the lap-joint enters the groove, thus allowing the plate to lie close up to the body, and not only hiding the joint but also strengthening the same.

I hereby distinctly disclaim anything shown and described in my Patent No. 84,803.

I claim—

1. In a scoop consisting of the body constructed of a single piece of sheet metal, the converging side portions, *a a*, united together by a double lap-joint, *g*, substantially as described.

2. In a scoop consisting of the body constructed of a single piece of sheet metal, the inner edges, *f f*, of the converging side portions, and the rear semicircular edge, *c*, of the bottom part united together by a double lap-joint, *h*, substantially as described.

3. In a scoop consisting of the body constructed of a single piece of sheet metal, a double lap-joint, *g*, and a handle constructed with a grooved end plate, D, whereby such handle is secured to the body opposite the lap-joint, the groove of the end plate being adapted to receive the lap-joint, substantially as described.

THOMAS B. DAVIS.

Witnesses:
ANDREW M. TODD,
JAMES H. HUNTER.